(12) United States Patent
Wolf

(10) Patent No.: US 11,560,912 B2
(45) Date of Patent: Jan. 24, 2023

(54) TOLERANCE COMPENSATION DEVICE

(71) Applicant: ILLINOIS TOOL WORKS INC., Glenview, IL (US)

(72) Inventor: Matthias Wolf, Rothenburg ob der Tauber (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 17/397,201

(22) Filed: Aug. 9, 2021

(65) Prior Publication Data

US 2022/0049732 A1  Feb. 17, 2022

(30) Foreign Application Priority Data

Aug. 13, 2020  (DE) ...................... 10 2020 121 338.7
Jul. 21, 2021  (DE) ...................... 10 2021 118 920.9

(51) Int. Cl.
*F16B 5/02*  (2006.01)

(52) U.S. Cl.
CPC .................................... *F16B 5/025* (2013.01)

(58) Field of Classification Search
CPC .............................. F16B 33/006; F16B 37/041
See application file for complete search history.

(56) References Cited

U.S. PATENT DOCUMENTS

| 5,492,388 | A | 2/1996 | Kawasaki |
| 2011/0243655 | A1 | 10/2011 | Binder |
| 2015/0139749 | A1 | 5/2015 | Metten |
| 2018/0172043 | A1 | 6/2018 | Bräutigam |

FOREIGN PATENT DOCUMENTS

| DE | 102008062894 B4 | 6/2010 |
| DE | 102012102906 A1 | 10/2013 |
| DE | 102015103491 A1 | 8/2016 |
| DE | 102018108829 | 10/2018 |
| DE | 102018108830 | 10/2018 |
| DE | 102019114008 A1 | 11/2020 |

(Continued)

OTHER PUBLICATIONS

DE102021100676 (Year: 2021).*

*Primary Examiner* — Jason L Vaughan
*Assistant Examiner* — Amanda Kreiling
(74) *Attorney, Agent, or Firm* — Thompson Hine LLP

(57) ABSTRACT

A tolerance compensation device includes a base device having a tubular fastening portion that includes an internal, right-hand thread for receiving a screw-like fastening element. A tubular connecting portion, for connecting to a compensation structure, has an outer jacket wall that includes an external thread for connecting to a compensation structure, and a compensation structure having a flange-like setting element. An inner jacket wall of the setting element includes a threading configured to correspond to the external thread, and a socket-like anti-rotation element is disposed in a through-opening of the setting element, and an outer jacket wall of the anti-rotation element is connected to an inner jacket wall of the tubular connecting portion in a non-rotatable manner. The compensation structure is configured for presetting a distance in axial direction between the base device and a contact wall of the compensation structure extending orthogonally to the axial direction.

10 Claims, 2 Drawing Sheets

(56) References Cited

FOREIGN PATENT DOCUMENTS

| | | |
|---|---|---|
| DE | 102021100676 A1 * | 7/2021 |
| DE | 102021100676 A1 | 7/2021 |
| EP | 0840021 A1 | 5/1998 |
| EP | 2162625 B1 | 3/2010 |
| EP | 3653823 A1 | 5/2020 |
| WO | WO 2016126284 A1 | 8/2016 |

* cited by examiner

TOLERANCE COMPENSATION DEVICE

TECHNICAL FIELD

The present invention relates to a tolerance compensation device.

BACKGROUND

EP 2 162 625 B1 discloses a fastening element receptacle or stopper. With this adjustable stopper, a position of a contact surface can be preset by means of a threaded section and an "anti-twisting section".

EP 3 653 823 A1 describes an adjustable stopper device for a vehicle door or hood. It includes a base part and an adjustment part, wherein the adjustment part is connected to the base part via a thread, as a result of which it is rotatable relative to the base part about a device axis. Also provided is a stopper part, which is configured to contact the vehicle door and provide an abutment surface for the vehicle door when the vehicle door is closed. The stopper part is connected to the adjustment part, wherein an axial position of the abutment surface can be adjusted by rotating the adjustment part relative to the base part about the device axis.

Anti-rotation safeguards for compensation elements are described in DE 10 2012 102 906 A1, for example.

DE 10 2008 062 894 B4 describes an anti-rotation safeguard. This is a drive sleeve made of plastic with an out-of-round outer surface and a correspondingly adapted countersurface on a lower part.

Tolerance elements or tolerance compensation devices are configured such that a gap created between body components on a vehicle is automatically compensated, as a result of which corresponding play between components is provided. However, this requires the use of a gauge in an assembly line to set the release value or the play. Tolerance compensation is usually carried out using an automatically readjusting tolerance element that is readjusted via a screw.

DE 10 2021 100 676 A1 provides a retaining element for fastening an attachment part or a tolerance compensation device. Further retaining elements are disclosed in DE 10 2018 10 88 29 and DE 10 2018 10 88 30. EP 0 840 021 A1, WO 2016/126284 A1, DE 10 2015 103 491 A1, DE 10 2019 114 008 A1 and U.S. Pat. No. 5,492,388 disclose further fastening or retaining devices.

SUMMARY

The object of the present invention is to provide a tolerance compensation device that is safe and reliable in operation.

A further object of the present invention is to provide an alternative to tolerance compensation devices (compensation nuts) known from the prior art.

One or more of these objects are achieved by the features of independent claim 1. Advantageous configurations are specified in the respective dependent subclaims.

According to the invention, a tolerance compensation device (compensation nut) is provided. It includes a base device having a tubular fastening portion, wherein the fastening portion comprises an internal thread for receiving a screw-like fastening element, wherein the internal thread is configured as a right-hand thread, and a tubular connecting portion for connecting to a compensation means, wherein an outer jacket wall of the connecting portion comprises an external thread for connecting to a compensation means, and a compensation means having a flange-like setting element, wherein an inner jacket wall of the setting element comprises a threading configured to correspond to the external thread of the connecting portion, and wherein a socket-like anti-rotation element is disposed in a through-opening of the setting element, and wherein an outer jacket wall of the anti-rotation element is connected to an inner jacket wall of the tubular connecting portion in a non-rotatable manner, wherein the compensation means is configured for presetting a distance in axial direction between the base device and a contact wall of the compensation means extending orthogonally to the axial direction.

The tolerance compensation device according to the invention and the coupling according to the invention between the base device and the compensation means makes it possible to preset a distance in axial direction between the base device and the contact wall provided for contacting a carrier component.

In such devices it is typically provided that an appropriate gauge, in particular a distance gauge, is used to produce a desired gap dimension. However, this is labor, time, and cost intensive. Tolerance elements thus require effort and time for the use of a measuring device to define a desired gap dimension.

In contrast, in the present invention, a corresponding distance between the base device and the contact wall of the compensation means can be preset in a non-rotatable manner, so that the tolerance compensation device can easily be connected to a component to be fastened or a carrier component. This is then subsequently fastened to a carrier component or a component, which can then be fixed to the carrier component or the component by means of the screw-like fastening element with a desired gap dimension with respect to surrounding components.

In the context of the present invention, a screw-like fastening element is a screw having a metric right-hand thread or a corresponding threaded bolt or the like.

Due to the non-rotatable connection of the outer jacket wall of the anti-rotation element to the inner jacket wall of the tubular connecting portion, a predetermined distance between the base device and the contact wall can be set safely and reliably.

In EP 2 162 625 B1, the threaded section and the "anti-twisting section" are disposed one after the other in axial direction, as a result of which a large amount of assembly space is required. In the present invention, on the other hand, comparable regions between the compensation means and the connecting portion of the base device are disposed to almost completely overlap one another in a starting position, as a result of which a corresponding assembly space can be significantly smaller. The tolerance compensation device is thus extremely compact.

In the present invention, it is provided that an unscrewing distance or a distance in axial direction between the base device and the contact wall of the compensation means extending orthogonally to the axial direction is not preset automatically via a screw, but rather manually. The anti-rotation element, which is preferably made of a soft component, serves as an anti-loosening protection but, due to its design, can be deformed inward when the fastening element or the spacer screw is rotated. A non-rotatable connection, preferably a friction- or form-locking connection, to the inner jacket wall of the tubular connecting portion is then established in order to hold the set position. Then, when the fastening screw is screwed in, the set position cannot change anymore, which is also not possible due to the fact that the screw blocks the deformation of the soft component as soon as it enters there.

The problem faced by many automobile manufacturers of having to use a large and cumbersome gauge on a production line to set a desired gap dimension is thus solved. Besides the gap dimension is lost during servicing in a workshop.

The tolerance compensation device according to the invention thus makes it possible to preset a distance in order to provide a desired gap dimension between body components and/or trim parts during assembly. The tolerance compensation device is thus provided to compensate fastening tolerances and play-related tolerances, in particular in the automotive industry, e.g. in the area of vehicle lamps. During assembly of the car, the amount of play between two parts is measured and the tolerance compensation device can be set to this value so that the play is predefined. The lamps can then be screwed on immediately without wasting time using a gauge in an OEM assembly line.

The tolerance compensation device according to the invention thus works according to a completely opposite operating principle compared to devices known from the prior art.

The external thread of the outer jacket wall of the connecting portion for connecting to the compensation means can be configured as a left-hand thread or as a right-hand thread. In the type of tolerance compensation device (compensation nut) according to the invention, the threads do not have to extend in opposite directions. It is also possible to use two right-hand threads, because direct interaction of the two threads is not necessary. In the existing compensation nuts with automatic distance adjustment caused by the fastening screw taking the compensation screw along with it, the direction of rotation for the external thread was mandatorily a left-hand thread. This concept, however, no longer requires the one screw to take the other screw along.

The connection between the outer jacket wall of the anti-rotation element and the inner jacket wall of the tubular connecting portion can be configured as a friction-locking connection, wherein the two jacket walls have a corresponding coefficient of friction relative to one another.

The coefficient of friction can be provided via an appropriate selection of material for the outer jacket wall of the anti-rotation element and the inner jacket wall of the tubular connecting portion.

By rotating the flange-like setting element, the distance in axial direction between the base device and the contact wall can easily be set by a user.

One rotation around a corresponding thread turn causes a displacement of the contact wall relative to the base wall with an accuracy of up to four hundredths of a mm.

The connection between the outer jacket wall of the anti-rotation element and the inner jacket wall of the tubular connecting portion can preferably be configured as a form-locking connection. For this purpose, the respective jacket walls preferably comprise webs and recesses that are configured to correspond to one another and extend in axial direction.

The connection between the outer jacket wall of the anti-rotation element and the inner jacket wall of the tubular connecting portion allows a desired distance in axial direction between the base device and the compensation means to be releasably preset and/or held in a non-rotatable manner.

The webs are preferably provided on an outer jacket wall of the anti-rotation element and can have an approximately semicircular cross-section. Correspondingly, grooves having an approximately semicircular cross-section are provided on the inner jacket wall of the tubular connecting portion [of the] setting element.

Alternatively, other suitable structures can also be provided in place of the webs, for example half spheres, or webs having a different suitable cross-section. It is also possible for recesses or the grooves to be configured on the inner jacket wall of the anti-rotation element and the webs to be configured on the inner jacket wall of the tubular connecting portion.

The compensation means can preferably be configured as a two-component injection molded part, whereby the setting element can be made of a hard component and the socket-like anti-rotation element can be made of a soft component such as TPE (thermoplastic elastomers), for example.

The compensation means can be manufactured quickly in a simple manner using a two-component injection molding process.

The socket-like anti-rotation element can comprise a through-opening which extends in axial direction, whereby an elastic deformation of the socket-like anti-rotation element which would lead to loosening of the connection between the outer jacket wall of the anti-rotation element and the inner jacket wall of the tubular connecting portion is blocked by disposing a fastening element in the through-opening.

A blocking of the anti-rotation element is thus immediately ensured as soon as an appropriate fastening element is introduced into the through-opening. There is therefore no need for an additional component and consequently the design of the device according to the invention is simple.

A radially inward extending and preferably radially circumferential connecting web can be provided in the through-opening of the socket-like anti-rotation element extending in axial direction for engaging in an external thread of a fastening element. The web, which engages inward from the soft component into the thread of the screw, thus creates a sealing lip that prevents the ingress of water along the screw.

The base device can preferably have a clip-like configuration, whereby a component to be fastened can be disposed in a receiving recess extending approximately orthogonally to the axial direction between the base device and the compensation means.

The clip-like configuration allows the tolerance compensation device to easily be attached to a component to be fastened. In the region of the through-opening of the tolerance compensation device, such a component also comprises a corresponding through-recess for the fastening element to pass through.

DE 10 2021 100 676 A1 provides a retaining element for fastening an attachment part or a tolerance compensation device. Said element includes a base element, wherein the base element comprises a plate-shaped fastening element for connecting to an attachment part and a threaded element that is integrally formed on the fastening element and comprises a through-opening, and a threaded socket comprising an internal thread configured to correspond to the thread of the threaded element, wherein a receiving element for receiving a fastening means is disposed in the region of a through-opening of the internal thread and connected to the threaded socket, and wherein a radially outward extending latching element is provided on the receiving element to prevent relative movement between the threaded element and the threaded socket during transport of the retaining element. With respect to the connection of this retaining element to a component, reference is hereby made to this document in its entirety.

The tolerance compensation device according to the invention can therefore be connected to a component in a similar manner.

The base device can alternatively also comprise a latching means device for connecting to a component to be fastened.

A captive securing means can furthermore be provided, which delimits an end stop with respect to a rotational movement of the compensation means relative to the base device, wherein a stop element is provided on the base device and a counterstop element is provided on the compensation means.

The captive securing means also creates an end stop for the aforementioned rotational movement.

The advantages of the tolerance compensation device according to the invention can be briefly summarized as follows.

- presettable gap dimension individually settable for different vehicles;
- elimination of gauges in the assembly line (time & cost savings);
- smaller assembly space;
- water tightness possible due to soft component;
- form fit between upper (compensation means) and lower (base device) parts for positioning;
- fastening screw blocks the position.

BRIEF DESCRIPTION OF THE DRAWINGS

The present invention will be described in more detail on the basis of design examples shown in the figures. The figures show.

DETAILED DESCRIPTION

Figure 1:
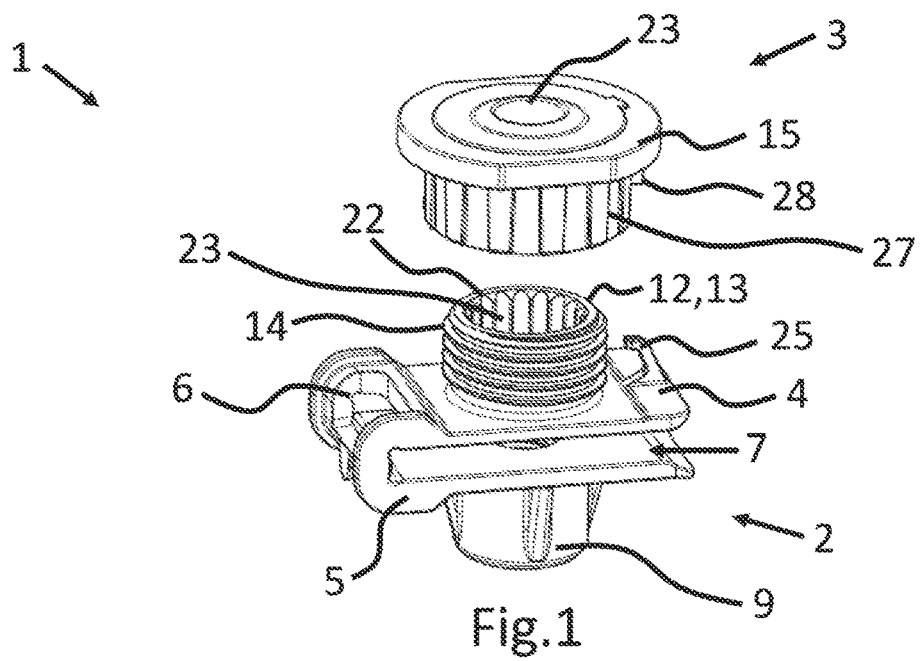
FIG. 1 a perspective exploded view of a tolerance compensation device according to the invention according to a first design example including a base device and a compensation means, FIG. 2 a lateral sectional view of the tolerance compensation device according to the invention in an initial state, FIG. 3 a cross-section along line A-A showing the connection between the base device and the compensation means, FIG. 4 a lateral sectional view of the tolerance compensation device with a component to be fastened, a carrier component and a fastening element having a preset distance in a final assembled state, FIG. 5 a further lateral sectional view of the tolerance compensation device with the fastening element, and FIG. 6 the tolerance compensation device according to the invention according to a second design example.
Figure 2:
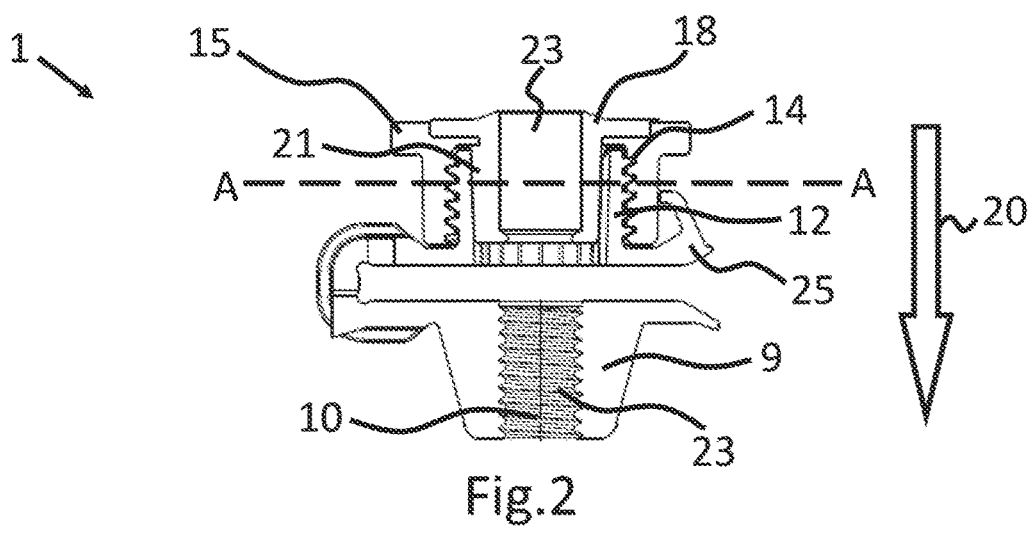
Figure 3:
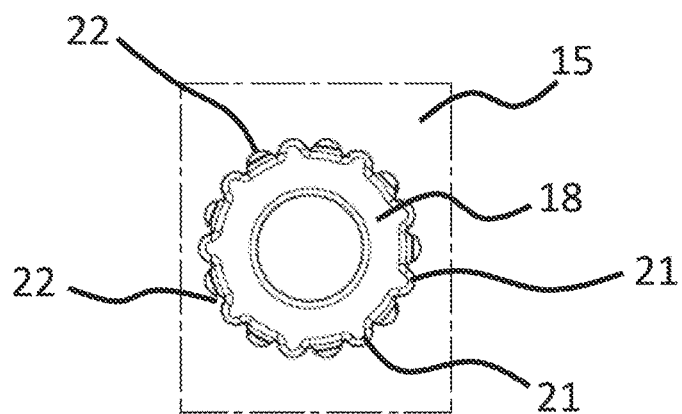
Figure 4:
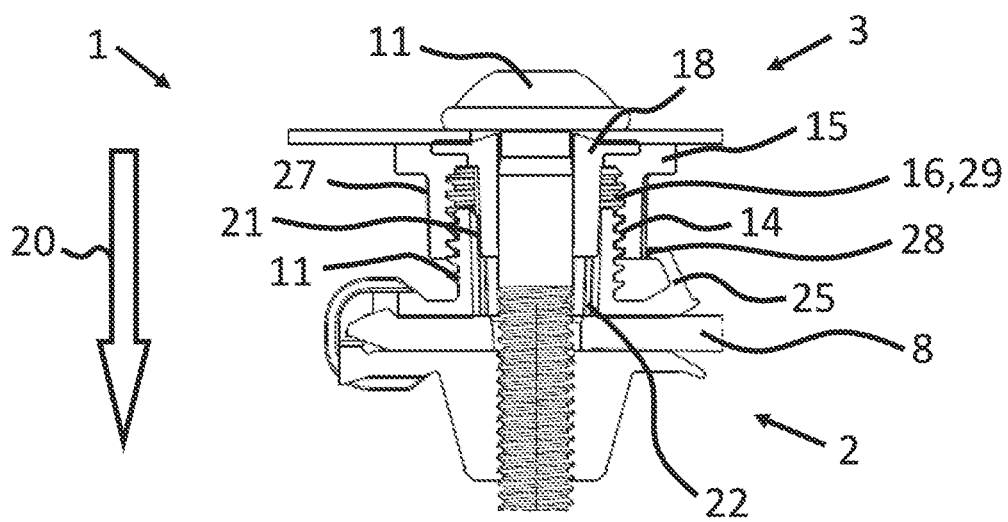
Figure 5:
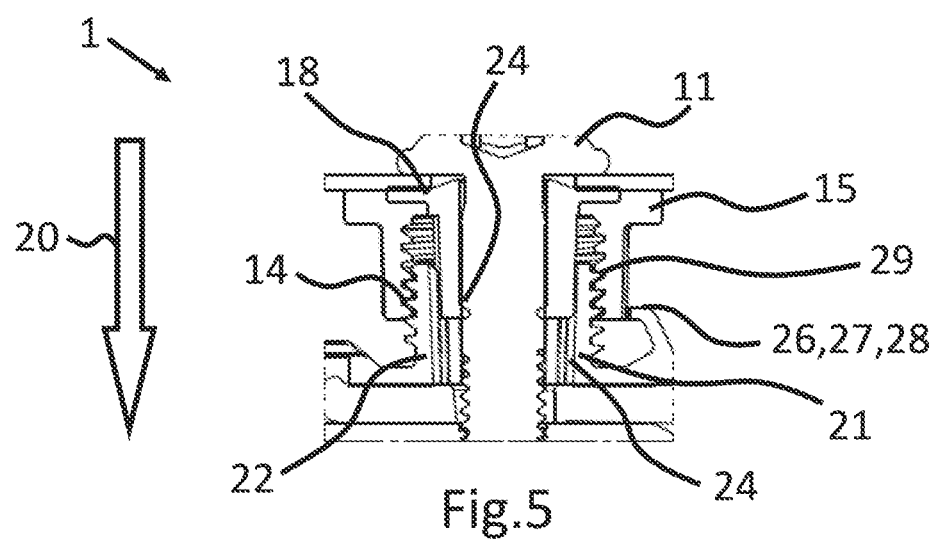

A tolerance compensation device 1 according to the invention is described in the following on the basis of a first design example (FIGS. 1 to 5).

The tolerance compensation device 1 includes a base device 2 and a compensation means 3.

The base device 2 has a clip-like configuration and comprises a compensation leg 4 and a fastening leg 5, which are approximately plate-shaped and are disposed parallel to and spaced apart from one another. A different suitable latching means device for connecting to a component can alternatively be provided.

The compensation leg 4 and the fastening leg 5 are connected to one another via a connecting leg 6. A receiving recess 7 for receiving a portion of a component 8 to be fastened is configured in the region between the compensation leg 4 and the fastening leg 5.

A fastening portion 9 is integrally formed on the side of the fastening leg 5 facing away from the receiving recess 7. The fastening portion 9 comprises an internal thread 10 for receiving a screw-like fastening element 11. The internal thread 10 is configured as a metric right-hand thread.

A tubular connecting portion 12 for connecting to the compensation means 3 is provided on the side of the compensation leg 4 facing away from the receiving recess 7.

An outer jacket wall 13 of the connecting portion 12 comprises an external thread 14 for connecting to the compensation means 3. The external thread 14 is preferably configured as a left-hand thread. The thread can alternatively also be configured as a right-hand thread.

In the context of the present invention, it is provided that the threads are configured to extend in opposite directions. It would thus theoretically also be possible for the internal thread 10 to be configured as a left-hand thread and the external thread 14 as a right-hand thread.

The compensation means 3 comprises a flange-like setting element 15. An inner jacket wall 16 of the setting element 15 comprises an internal thread 29 configured to correspond to the external thread 14 of the connecting portion 12.

An elastic and/or flexible socket-like anti-rotation element 18 is disposed in a through-opening 17 of the setting element 15.

An outer jacket wall 19 of the anti-rotation element 18 comprises webs 21 which extend in axial direction 20 in a radially circumferential manner and equidistant from one another.

The inner jacket wall 16 of the tubular connecting portion 12 comprises recesses 22 which extend in axial direction 20 in a radially circumferential manner and equidistant from one another. The recesses 22 are configured to correspond to the webs 21.

In the context of the present invention, it can also be provided that recesses 22 are disposed on the anti-rotation element 18 and the webs 21 are correspondingly disposed on the inner jacket wall 16 of the tubular connecting portion 12.

The socket-like anti-rotation element 18 comprises a fastening element through-opening 23 that extends in axial direction 20. This fastening element through-opening 23 is axially aligned in the compensation leg 4 as well.

Inserting the fastening element 11 into the fastening element through-opening 23 prevents elastic and/or flexible deformation of the socket-like anti-rotation element 18. Such a deformation of the anti-rotation element 18 in the direction of the through-opening leads to a loosening of the connection between the outer jacket wall 19 of the anti-rotation element 18 and the inner jacket wall 16 of the connecting portion 12.

A radially inward extending and preferably radially circumferential connecting web 24 is provided in the fastening element through-opening 23 of the socket-like anti-rotation element 18 for engaging in an external thread or a shaft of the fastening element 11.

In addition, a stop element 25 of a captive securing means 26 is provided on the compensation leg 4 of the base device 2.

A corresponding counterstop element 28 of the captive securing means 26 is configured on an outer jacket wall 27 of the setting element 15. The captive securing means 26 also creates an end stop.

The stop element is configured as an arm which extends approximately in axial direction. The counterstop element 28 can be an integrally formed projection on the setting element.

If the compensation means 3 is rotated relative to the base device 2 via the corresponding threaded connection, or if the two components are rotated relative to one another, the counterstop element 28 will eventually strike the stop element 25 and thus limit the rotational movement between the base device 2 and the compensation means 3. This also ensures that, in the assembled state, the base device 2 and the compensation means 3 do not become detached from one another during transport.

The tolerance compensation device 1 can preferably be made of a plastic using an injection molding process. The compensation means 3 is preferably configured as a two-component injection molded part, wherein the setting element 15 is made of a hard component and the socket-like anti-rotation element 18 is made of a soft component, such as TPE.

Figure 6:
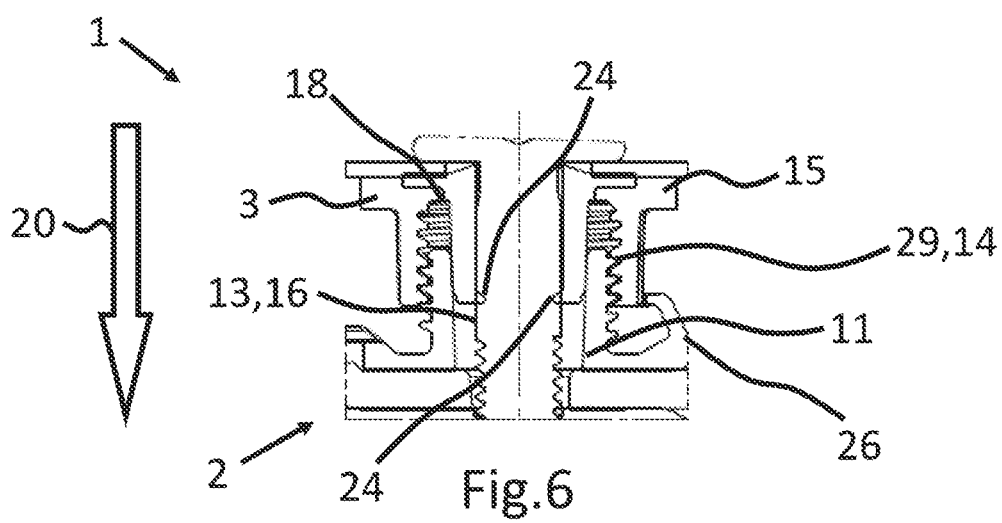

A compensation device according to the invention according to a second design example is briefly described in the following (FIG. 6).

The tolerance compensation device 1 according to the second design example corresponds substantially to the tolerance compensation device 1 according to the first design example. Unless otherwise described, the same components are present, which are accordingly provided with the same reference signs.

In the tolerance compensation device 1 according to the second design example, the connection between the outer jacket wall 19 of the anti-rotation element 18 and the inner jacket wall 16 of the tubular connecting portion 12 is configured as a friction-locking connection. The friction-locking connection is provided by the two jacket walls 13, 16 having a corresponding coefficient of friction relative to one another.

A locking region between the compensation means and the base device thus prevents a rotational movement of the compensation means, preferably by means of a form fit. A loss of position during transport or due to rattling is not possible. If the compensation means is rotated by hand or using a tool, the anti-rotation element (TPE component) deforms in the center so that it can be rotated further, whereby the anti-rotation element is then locked to the connecting portion again and secured by a form fit. The predefined value for the distance and a later gap dimension can thus be preset. According to the second design example having the friction-locking connection, the jacket surfaces 16 and 19 are embodied as smooth surfaces. There are no elements that snap into one another. And the soft component also does not deform inward when rotated. The invention simply provides for a suitably large contact surface between the soft component and the jacket surface 16 to produce such a large amount of friction that the fastening/compensation screw cannot rotate on its own, but rather has to be subjected to a specific amount of torque manually or via a tool to rotate and thus set the position. The blocking function of the screw would be lost in this variant, but there is instead a completely continuously variable adjustment of the gap dimension.

Inserting the fastening element 11 into the fastening element through-opening 23 prevents elastic and/or flexible deformation of the socket-like anti-rotation element 18. Alternatively, a pin or another blocking element can be provided for this purpose instead of the screw.

A trim part or a body component can alternatively also be fastened by clipping a pin into the base part.

LIST OF REFERENCE SIGNS

1 Tolerance compensation device
2 Base device
3 Compensation means
4 Compensation leg
5 Fastening leg
6 Connecting leg
7 Receiving recess
8 Component
9 Fastening portion
10 Internal thread
11 Fastening element
12 Connecting portion
13 Outer jacket wall of the connecting portion
14 External thread
15 Setting element
16 Inner jacket wall
17 Through-opening
18 Anti-rotation element
19 Outer jacket wall of the anti-rotation element
20 Axial direction
21 Web
22 Recess
23 Fastening element through-opening
24 Connecting web
25 Stop element
26 Captive securing means/end stop
27 Outer jacket wall
28 Counterstop element

The invention claimed is:

1. A tolerance compensation device including
a base device and a compensation means,
the base device having a tubular fastening portion, wherein the fastening portion comprises an internal thread for receiving a screw-like fastening element, wherein the internal thread is configured as a right-hand thread, and a tubular connecting portion for connecting to the compensation means, wherein an outer jacket wall of the connecting portion comprises an external thread for connecting to the compensation means, and
the compensation means having a flange-like setting element, wherein an inner jacket wall of the setting element comprises a threading configured to correspond to the external thread of the connecting portion, and wherein a socket-like anti-rotation element is disposed in a through-opening of the setting element, and wherein an outer jacket wall of the anti-rotation element is connected to an inner jacket wall of the tubular connecting portion in a non-rotatable manner, wherein the compensation means is configured for presetting a distance in axial direction between the base device and a contact wall of the compensation means extending orthogonally to the axial direction;
wherein a form-locking connection is provided between the outer jacket wall of the anti-rotation element and the inner jacket wall of the tubular connecting portion, wherein the form-locking connection comprises one of: (i) webs on the outer jacket wall and recesses on the inner jacket wall or (ii) webs on the inner jacket wall and recesses on the outer jacket wall, wherein the webs and recesses are configured to correspond to each other.

2. The tolerance compensation device according to claim 1,
wherein
the webs and recesses are semicircular in cross-section.

3. The tolerance compensation device according to claim 1,
wherein
the socket-like anti-rotation element comprises a through-opening which extends in axial direction, wherein an elastic deformation of the socket-like anti-rotation element which leads to loosening of the connection between the outer jacket wall of the anti-rotation element and the inner jacket wall of the tubular connecting portion is blocked by disposing a fastening element in the through-opening.

4. The tolerance compensation device according to claim 1,
wherein
a radially inward extending and radially circumferential connecting web is provided in the through-opening of the socket-like anti-rotation element extending in axial direction for engaging in an external thread of a fastening element.

5. The tolerance compensation device according to claim 1,
wherein
the base device has a clip-like configuration, wherein a component to be fastened can be disposed in a receiving recess extending approximately orthogonally to the axial direction between the base device and the compensation means, or wherein
the base device is provided a latching means device for connecting to a component to be fastened.

6. The tolerance compensation device according to claim 1,
wherein
a captive securing means which forms an end stop is provided to limit a rotational movement between the compensation means and the base device, wherein a stop element is provided on the base device and a counterstop element is provided on the compensation means.

7. The tolerance compensation device according to claim 1,
wherein
the external thread of the outer jacket wall of the connecting portion for connecting to the compensation means is configured as a left-hand thread or as a right-hand thread.

8. The tolerance compensation device according to claim 1,
wherein
the compensation means is configured as a two-component injection molded part, wherein the setting element is made of a hard component and the socket-like anti-rotation element is made of a soft component.

9. A tolerance compensation device, including:
a base device and a compensator,
the base device having a tubular fastening portion, wherein the fastening portion comprises an internal thread for receiving a screw-like fastening element, wherein the internal thread is configured as a right-hand thread, and a tubular connecting portion for connecting to the compensator, wherein an outer jacket wall of the connecting portion comprises an external thread for connecting to the compensator, and
the compensator having a flange-like setting element, wherein an inner jacket wall of the setting element comprises a threading configured to correspond to the external thread of the connecting portion, and wherein a socket-like anti-rotation element is disposed in a through-opening of the setting element, and wherein an outer jacket wall of the anti-rotation element is connected to an inner jacket wall of the tubular connecting portion in a non-rotatable manner, wherein the compensator is configured for presetting a distance in axial direction between the base device and a contact wall of the compensator extending orthogonally to an axial direction;
wherein a form-locking connection is provided between the outer jacket wall of the anti-rotation element and the inner jacket wall of the tubular connecting portion, wherein the form-locking connection comprises one of: (i) webs on the outer jacket wall and recesses on the inner jacket wall or (ii) webs on the inner jacket wall and recesses on the outer jacket wall, wherein the webs and recesses are configured to correspond to each other.

10. The tolerance compensation device according to claim 9, wherein the compensator is configured as a two-component injection molded part, wherein the setting element is harder than the socket-like anti-rotation element.

* * * * *